UNITED STATES PATENT OFFICE.

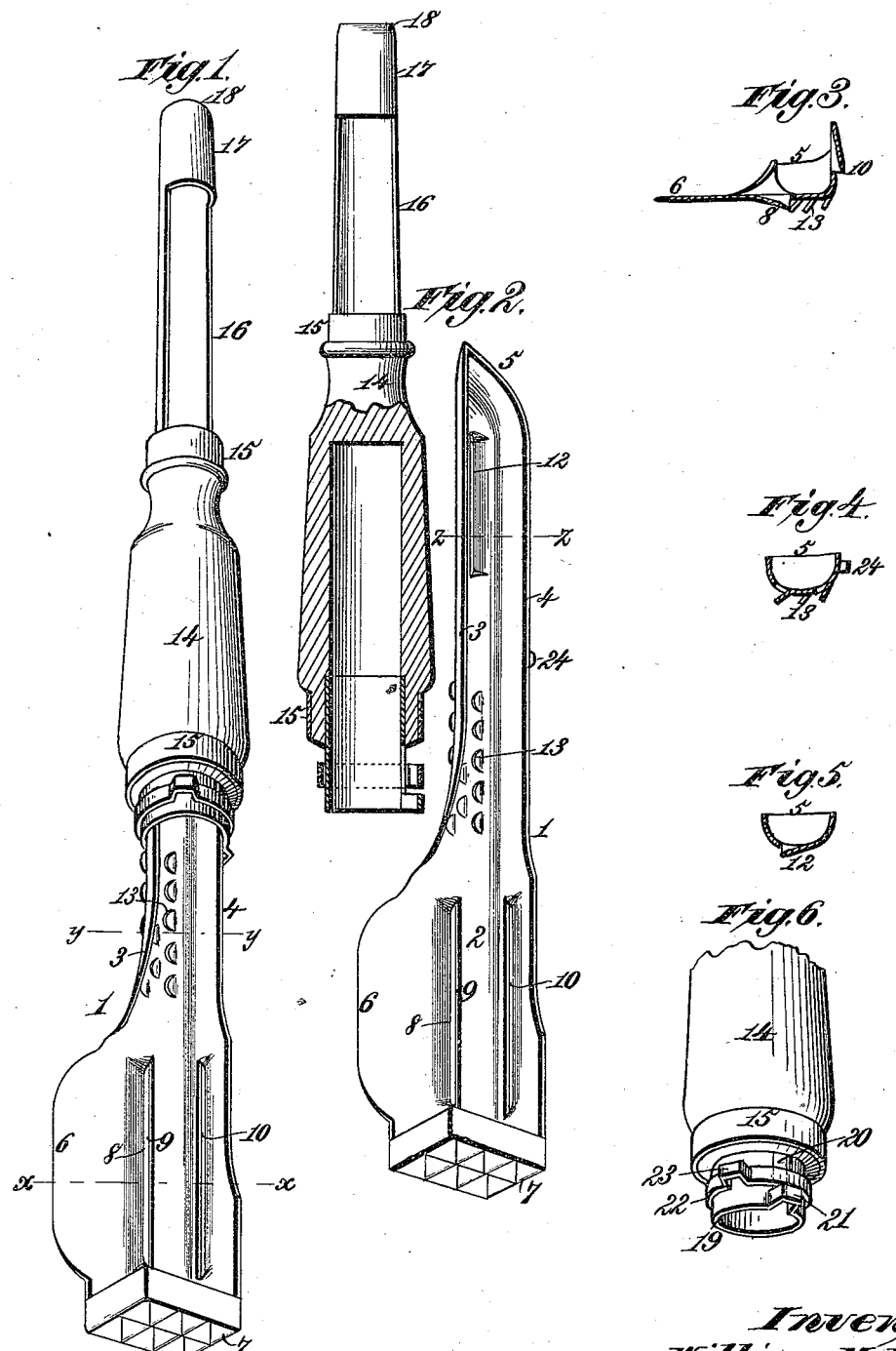

WILLIAM HERBERT DAWSON AND HENRY GOODWIN, OF MANCHESTER, ENGLAND.

VEGETABLE AND FRUIT PARER.

SPECIFICATION forming part of Letters Patent No. 427,056, dated May 6, 1890.

Application filed May 27, 1889. Serial No. 312,347. (No model.) Patented in England February 23, 1889, No. 3,294.

*To all whom it may concern:*

Be it known that we, WILLIAM HERBERT DAWSON and HENRY GOODWIN, subjects of the Queen of Great Britain, residing at Manchester, England, have invented certain new and useful Improvements in Vegetable and Fruit Parers, (for which we obtained Letters Patent in Great Britain February 23, 1889, No. 3,294,) of which the following is a specification.

This invention relates to devices for paring and slicing potatoes and other vegetables and fruits; and it has for its object to provide a more useful implement which is adapted for various purposes, such as paring, slicing, mincing or chopping, coring, and grating.

The invention consists in the features of construction and combination or arrangement of parts, hereinafter described, and set forth in the claims, reference being made to the accompanying drawings, in which—

Figure 1 is a perspective view of an implement embodying all of our invention. Fig. 2 is a similar view showing the hollow handle in section and separated from the paring, slicing, chopping, and mincing device. Fig. 3 is a detail transverse sectional view taken on line $x\ x$, Fig. 1. Fig. 4 is a similar view taken on the line $y\ y$, Fig. 1. Fig. 5 is a similar view taken on the line $z\ z$, Fig. 2; and Fig. 6 is a detail perspective view of one end of the hollow handle, showing the locking device for attaching the parer and chopper.

In order to enable those skilled in the art to make and use our invention, we will now describe the same in detail, referring to the drawings, where the numeral 1 indicates what we will term the "parer," which is composed of a sheet of metal struck up into a trough-shaped shank, forming a grasping-handle and comprising a flat or flattened bottom wall 2, and side flanges 3 and 4 arranged at right angles, or approximately so, to such bottom wall, and joined at one extremity to form a scoop-shaped gouge 5 for removing the eyes of a potato or for analogous purposes. The flange 4 extends the full length of the bottom wall 2, while the flange 3 terminates at one edge of a convex chopping blade or cutter 6, formed by widening the bottom wall, and that extremity of the latter which is opposite the scoop-shaped gouge 5 carries a cellular cutter 7, formed by a surrounding frame and cutting-blades crossing each other and so arranged as to form a series of cells and adapted for mincing or severing vegetables and other articles into small similarly-shaped pieces. The cellular cutter is preferably made from strips of metal united by brazing, soldering, or riveting; but as the manner of uniting the parts is immaterial we do not more fully illustrate the same. The convex chopping blade or cutter is located in the plane of the bottom wall 2, and the latter is provided with a paring blade or cutter 8, formed by slitting the wall longitudinally, as at 9, pressing the metal outward and sharpening it into a bit-like edge for paring vegetables and fruits. The flange 4, at a point near the cellular cutter 7, is also provided with a longitudinal paring blade or cutter 10, formed in the same way as the blade 8, but preferably so made that it projects at less distance than said blade 8, so as to provide for paring or slicing different thicknesses—that is, the blade 10 can be made to pare or slice at one thickness and the blade 8 at another thickness. The wall 2 of the paring device is also provided adjacent to the gouge 5 with a longitudinal paring blade or cutter 12, formed by slitting and pressing the metal outward, as before explained with reference to the blade 8. The trough-like shank of the parer is provided with a grating-surface 13 for grating horse-radish and other articles, and this surface is formed by a series of alternating teeth pressed out from the body of metal constituting the shank.

The implement thus far described is complete in itself, and is well adapted for the several purposes mentioned; but to provide a more useful and desirable article we employ a hollow handle 14, of wood, bound at each end by a ferrule 15, and adapted to receive within it the trough-like shank of the parer, so that the parts occupy the position shown in Fig. 1. The hollow or tubular handle is preferably composed of wood, as stated; but obviously any suitable material may be employed. It is provided at what we will term the "outer end" with an attached metallic plate, semicircular in cross-section for a part of its length, as at 16, and terminating at its outer extremity in a hollow cylinder 17, formed into an annular cutting-edge 18, and forming an apple-corer. The inner end of the hollow handle is provided with a fixed tube 19, having a longitudinal slot 20 and an arched bridge-piece 21 over the outer end portion of the slot, and on this tube is loosely arranged to turn a ring or collar 22, having an arched bridge-piece 23, which can be moved into and out of coincidence with the bridge-piece 21. The shank of the paring device is provided with a lateral stud 24 to pass through the bridge-pieces 21 and 23, when the shank is inserted into the hollow handle in such manner that when the stud passes the ring or collar 22 the latter can be turned to place its bridge-piece 23 out of coincidence with the bridge-piece 21, thereby causing the ring or collar to engage the stud and lock the paring device to the hollow handle.

The paring device can be made of a thin sheet of steel, and the cutters are all finished with a suitable cutting-edge. The three blades 8, 10, and 12 are preferably so arranged that they cut to different depths for paring and slicing varying thicknesses.

We are aware that a sheet-metal paring device has heretofore been provided with a slit having one edge turned laterally and sharpened to form a cutting-blade, and such, therefore, we do not broadly claim.

Having thus described our invention, what we claim is—

1. A vegetable and fruit parer comprising a bottom wall 2, having a paring and slicing blade 8, a convex chopping-blade 6, and a side flange 4, provided with a paring and slicing blade 10, substantially as described.

2. A vegetable and fruit parer comprising a shank, a bottom wall 2, having a paring and slicing blade 8, a convex chopping-blade 6, and a cellular cutter 7, substantially as described.

3. A vegetable and fruit parer comprising a shank, a bottom wall having the longitudinal paring and slicing blades 8 and 12, the side flange 4, provided with the paring and slicing blade 10, and the cellular cutter 7 at the end of the bottom wall, substantially as described.

4. A vegetable and fruit parer consisting of a sheet of metal formed with the side flanges 3 and 4, longitudinal paring and slicing blades 8, 10, and 12, grating-surface 13 and chopping-blade 6, and provided at one end with the cellular cutter 7, substantially as described.

5. The combination, with the hollow handle 14, of a paring device comprising a shank, paring and slicing blades, and a lateral stud, and adapted to enter the hollow handle, and a locking device for attaching the hollow handle and the paring device together, substantially as described.

6. An implement for cutting and paring vegetables and fruits, consisting of a hollow handle having at one end the slot 20, the bridge-piece 21, and the rotating ring or collar 22, having the bridge-piece 23, a paring device comprising paring-blades, and a shank having a lateral stud 24, substantially as described.

In testimony whereof we affix our signatures to the foregoing specification.

WILLIAM HERBERT DAWSON.
HENRY GOODWIN.

Witnesses:
JOHN G. WILSON,
WALTER GUNN.